United States Patent
Cheng et al.

(10) Patent No.: US 11,991,080 B2
(45) Date of Patent: May 21, 2024

(54) METHOD OF FILTERING PACKETS IN NETWORK SWITCH AND RELATED FILTER

(71) Applicant: Realtek Semiconductor Corp., HsinChu (TW)

(72) Inventors: Kai-Wen Cheng, HsinChu (TW); Sz-Han Wang, HsinChu (TW); Wen-Huang Yeh, HsinChu (TW); Wei-Hong You, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 350 days.

(21) Appl. No.: 17/674,823

(22) Filed: Feb. 17, 2022

(65) Prior Publication Data

US 2022/0294733 A1 Sep. 15, 2022

(30) Foreign Application Priority Data

Mar. 10, 2021 (TW) .................................. 110108432

(51) Int. Cl.
*H04L 45/741* (2022.01)
*H04L 45/00* (2022.01)
*H04L 45/745* (2022.01)

(52) U.S. Cl.
CPC ............ *H04L 45/741* (2013.01); *H04L 45/20* (2013.01); *H04L 45/745* (2013.01)

(58) Field of Classification Search
CPC ...... H04L 45/741; H04L 45/20; H04L 45/745
See application file for complete search history.

(56) References Cited

U.S. PATENT DOCUMENTS

| | | | | |
|---|---|---|---|---|
| 7,849,507 | B1 * | 12/2010 | Bloch | H04L 63/168 |
| | | | | 726/22 |
| 11,496,438 | B1 * | 11/2022 | Bocchino | H04L 61/5007 |
| 2007/0083924 | A1 * | 4/2007 | Lu | H04L 63/0227 |
| | | | | 726/13 |
| 2009/0097418 | A1 * | 4/2009 | Castillo | H04L 41/147 |
| | | | | 370/255 |
| 2010/0082811 | A1 | 4/2010 | Van Der Merwe | |
| 2016/0087892 | A1 * | 3/2016 | Janakiraman | H04L 45/745 |
| | | | | 370/392 |
| 2017/0339048 | A1 * | 11/2017 | Thomas | H04L 69/325 |
| 2021/0367927 | A1 * | 11/2021 | Selvaraj | H04L 45/74591 |
| 2023/0208874 | A1 * | 6/2023 | Ballew | H04L 63/1416 |
| | | | | 726/23 |

* cited by examiner

*Primary Examiner* — Abdullahi Ahmed
(74) *Attorney, Agent, or Firm* — Winston Hsu

(57) ABSTRACT

A method for packet filtering in a network switch includes: utilizing an access control list circuit to filter received packets, wherein the access control list circuit compares header information of the received packets with an access control list to filter the received packets, where the access control list has at least one entry, and rule information in the entry includes only a portion of an IP address; and utilizing a routing circuit to further filter packets that pass the access control list circuit, wherein the routing circuit compares header information of the packets that pass the access control list circuit with a routing table to filter the packets, wherein the routing table has at least one entry, and rule information in the entry includes an entire IP address.

14 Claims, 4 Drawing Sheets

METHOD OF FILTERING PACKETS IN NETWORK SWITCH AND RELATED FILTER

BACKGROUND OF THE INVENTION

1. Field of the Invention

The present invention relates to network switch, and more particularly, to a method and a related filter that implements packet filtering in a network switch based on cooperative operations of an access control list circuit and a routing circuit.

2. Description of the Prior Art

In an Ethernet communication system, a network switch is hardware that receives and forwards data to a destination device by means of packet exchanging, thereby interconnecting devices on the network system. The network switch can filter packets according to administrator's policies, so as to achieve network security protection mechanisms, such as firewalls, whitelisting or blacklisting.

Typically, Ethernet switch comprises access control lists. Based on administrator's policies, entries of an access control list will define specific rule information to allow or prohibit specific packets to be forwarded through the network switch, thereby achieving packet filtering. In order to increase the speed of packet exchange, the access control list is usually implemented by hardware circuits, which include memories for recording the access control list, and comparators for comparing header information of packets with entries of the access control list. Therefore, if it is desired to improve the configurability of the access control list, related hardware circuit needs to be expanded.

On the other hand, with the evolution of the network generation, IPv6 protocol has become popular. Although it has solved the problem of insufficient IP addresses, it also brings an impact on network equipment. For example, the aforementioned active access control lists will have increased requirements on the field lengths due to the longer IP addresses in IPv6 protocol. Under typical circumstances, an entry in the access control list may take up more than 40 bytes of memory space. As a result, the hardware cost and circuit area of the Ethernet switch are considerable burden.

SUMMARY OF THE INVENTION

With this in mind, it is one object of the present invention to provide a method for filtering packets in a network switch. Embodiments of the present invention achieve packet filtering function of the network switch based on the cooperative operations of an access control list circuit and a routing circuit. Specifically, the access control list circuit may filter packets according to a portion of a source IP address and/or a portion of a destination IP address, while the routing circuit may filter packets according to an entire source IP address and/or an entire destination IP address. During packet filtering, only partial content of a source IP address and/or partial content of a destination IP address are recorded in entries of the access control list, while entire content of a source IP address and/or entire content of a destination IP address are recorded in entries of a routing table in the routing circuit. In view of this, the present invention significantly reduces hardware requirements of the access control list circuits.

According to one embodiment, a method for packet filtering in a network switch is provided. The method comprises: utilizing an access control list circuit to filter received packets, wherein the access control list circuit compares header information of the received packets with an access control list to filter the received packets, where the access control list has at least one entry, and rule information associated with IP address in the at least one entry includes only partial content of an IP address and the partial content of the IP address does not overlap with partial contents of IP addresses of other access control lists in the network switch; and utilizing a routing circuit to further filter packets that pass the access control list circuit, wherein the routing circuit compares header information of the packets that pass the access control list circuit with a routing table to filter the packets, wherein the routing table has at least one entry, and rule information associated with IP address in the at least entry of the routing table includes entire content of an IP address.

According to one embodiment, a filter implemented in a network switch is provided. The filter comprises: an access control list circuit and a routing circuit. The access control list circuit is arranged to filter received packets, wherein the access control list circuit compares header information of the received packets with an access control list to filter the received packets, where the access control list has at least one entry, and rule information associated with IP address in the at least one entry includes only partial content of an IP address and the partial content of the IP address does not overlap with partial contents of IP addresses of other access control lists in the network switch. The routing circuit is arranged to further filter packets that pass the access control list circuit, wherein the routing circuit compares header information of the packets that pass the access control list circuit with a routing table to filter the packets, wherein the routing table has at least one entry, and rule information associated with IP address in the at least entry of the routing table includes entire content of an IP address.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Figure 1:
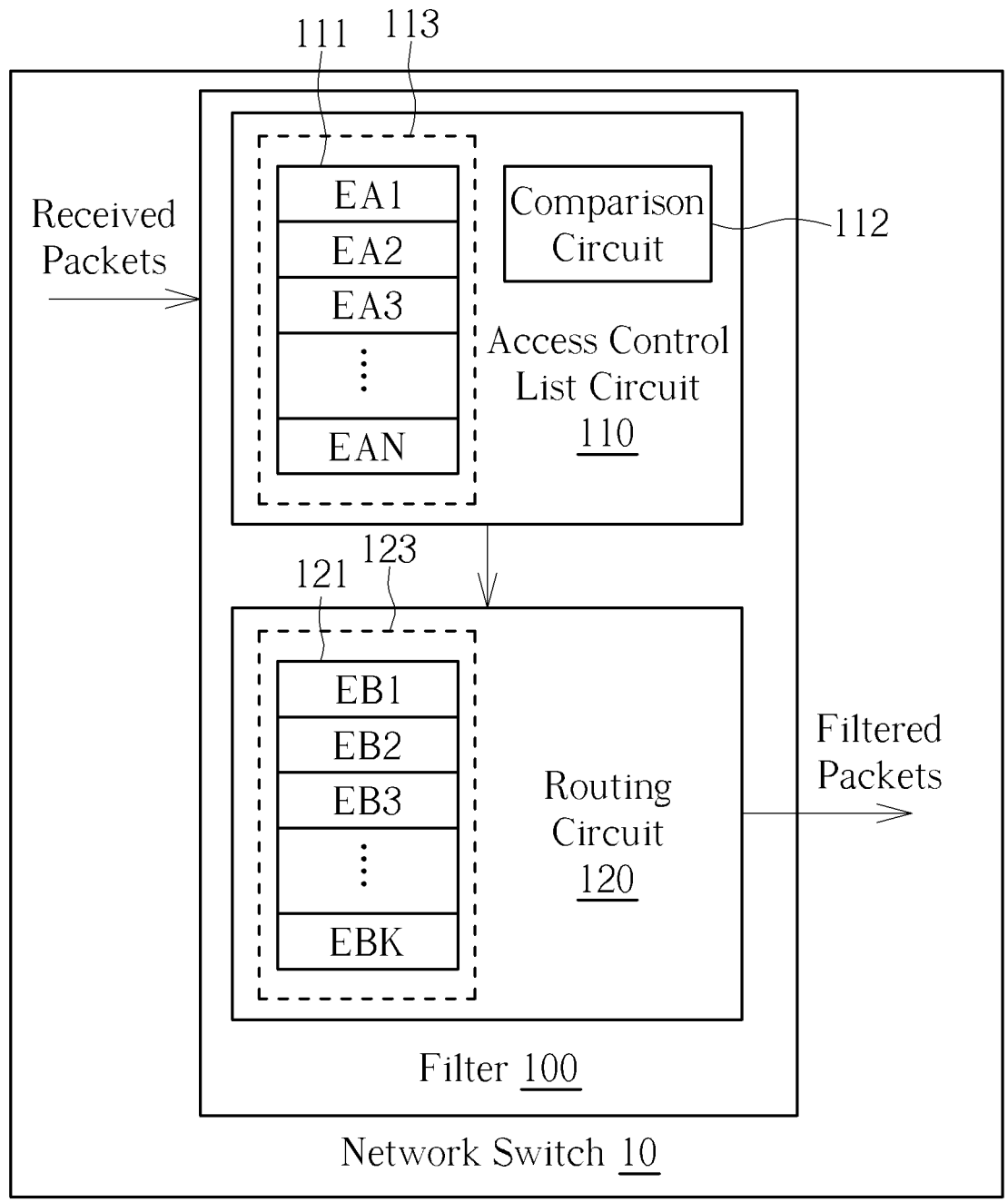
FIG. 1 is a schematic diagram of a filter according to one embodiment of the present invention.

Please refer to FIG. 1, which illustrates a schematic diagram of a filter according to one embodiment of the present invention. As shown in FIG. 1, a filter 100 is implemented by multiple hardware components of a network switch 10 and is employed in the network switch 10 to filter packets received by the network switch 10. The filter 100 includes an access control list circuit 110 and a routing circuit 120. The access control list circuit 110 includes a comparison circuit 112 and a storage unit 113. An access control list 111 is stored in the storage unit 113. The access control list 111 has a plurality of entries EA1-EAN. Contents of the entries are determined according to administrator's policies. Each of the entries EA1-EAN records specific rule information, for example, features regarding packets that are allowed to pass the filter 100, or features regarding packets that are not prohibited to pass the filter 100.

Figure 2A:
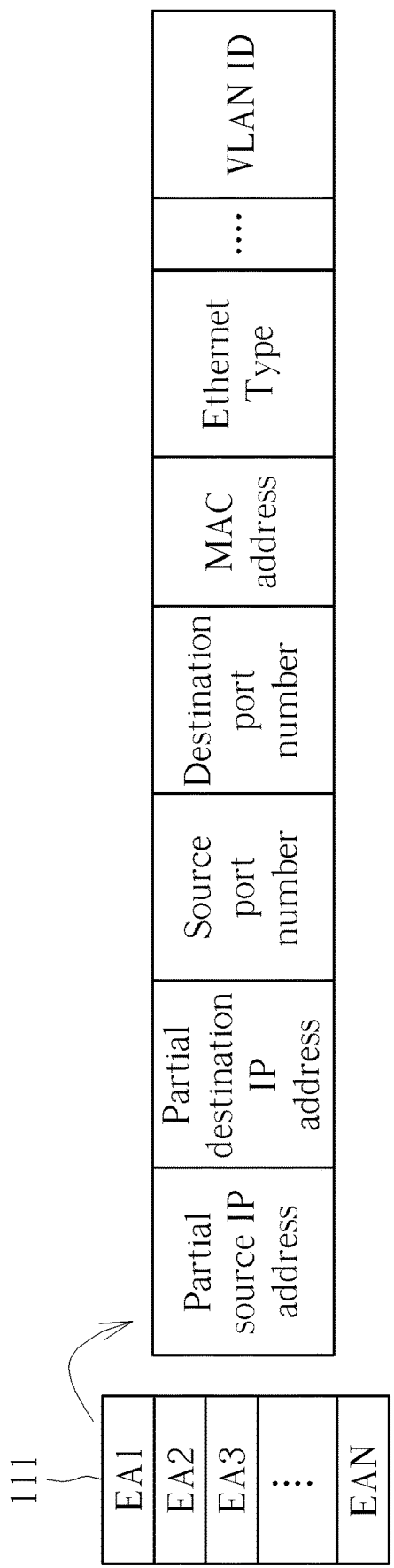
FIG. 2A and FIG. 2B are diagrams illustrating contents of an access control list and a routing table according to one embodiment of the present invention.

These features, as shown in FIG. 2A, include (but are not limited to) one or more of: partial source IP address, partial destination IP address, source port number, destination port number, source/destination media access control address, Ethernet type, and virtual local access network (VLAN) ID. The access control list circuit 110 will compare the rule information recorded in the entries EA1-EAN with information recorded in packet headers of packets through the comparison circuit 112, thereby to determine whether or not a packet is allowed to pass the filtering of the access control list circuit 110. Packets meeting the rule information will be further sent to the routing circuit 120, while packets not meeting the rule information will be discarded. For the rule information associated with the source IP address and the rule information associated with the destination IP address, the access control list 111 of the access control list circuit 110 records only partial content of a source IP address and partial content of a destination IP address. In addition, it should be noted that partial contents of IP addresses in the access control list 111 does not overlap with partial contents of IP addresses of other access control lists in the access control list circuit 110.

Furthermore, if the network switch 10 is a network device that is compliant with IPv6 protocol, a source IP address and a destination IP address in header information of the received packet are also complaint with IPv6 protocol, which may have 128 bits long. The rule information associated with the source IP addresses and the rule information associated with the destination IP address recorded in the access control list 111 will not include all 128 bits, but only a portion of 128 bits. In other words, when the source IP address and/or destination IP address of a packet meets the rule information in the access control list 111, the packet may still fail to pass the filtering performed by the routing circuit 120 in a following stage. In addition, it should be noted that contents of entries of the access control list 111 shown in FIG. 2A is not a limitation of the invention. According to various embodiments of the present invention, rule information of an entry in the access control list 111 may include more or fewer packet features.

Figure 2B:
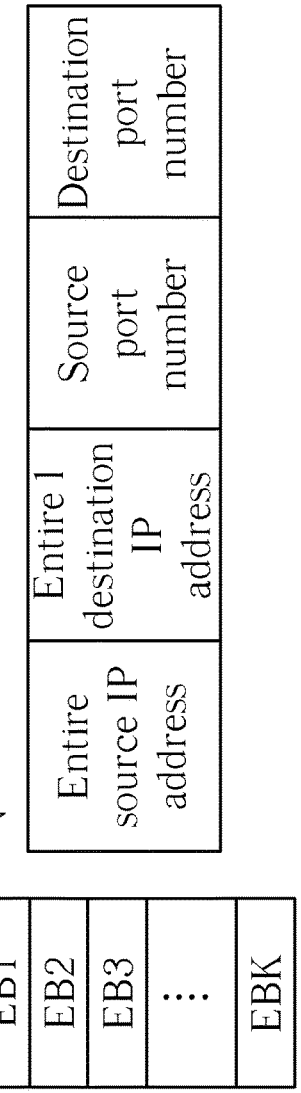

Furthermore, the routing circuit 120 includes a storage unit 123, and a routing table 121 is stored in the storage unit 123. When the packet filtering operation of the filter 110 is performed, entries EB1-EBK of the routing table 121 may be as shown in FIG. 2B, recording one or more packet features: entire source IP address, entire destination IP address, source port number and destination port number. The routing circuit 120 compares header information of packets with the entries EB1-EBK in the routing table 121 to determine whether or not a packet is allowed to pass the filter 100. Packets that meet the contents of the entries EB1-EBK will pass to the next layer (layer 3 (L3)), waiting for packet forwarding performed by other parts of the network switch 10. Packets that do not meet the content of the entries will be discarded. In the present invention, for entries associated with source IP address and destination IP address, the routing table 121 records entire contents of source IP addresses and entire contents of destination IP addresses. In the IPv6 example, the rule information associated with the source IP address and the destination IP address recorded by the routing table 121 contains complete 128-bit information. In addition, it should be noted that the contents of the entries of the routing table 121 shown in FIG. 2B is not a limitation of the present invention. In various embodiments of the present invention, rule information of an entry in the routing table 121 may contain more or fewer packet features.

Since the routing circuit 120 also serves as the routing engine of the network switch 10 and packet filtering belongs to layer 2 (L2) networking, the routing circuit 120 will disable a portion of the functions belonging to layer 3 (L3) networking when performing packet filtering. In view of this, the routing circuit 120 will not perform any possible modification operation on headers of the packets during packet filtering. The prohibited modification operations include: source address replacement, VLAN ID replacement, and decrementing packet's hop limit. The above-mentioned functions will be disabled when the routing circuit 120 performs packet filtering, and will not be enabled until the routing circuit 120 starts to perform packet routing.

In one embodiment, when the routing circuit 120 performs packet filtering, in addition to comparing header information with entries in the routing table 121 to determine whether to discard or forward the packets, it may also perform verifications/check operations, such as IP header validation, MAC/IP address checksum (such as. checking mismatch address, zero address, or IP class), or unicast reverse path forwarding check. Typically, if these verification/check operations are achieved by the access control list circuit 110, hardware requirements of the access control list circuit 110 will be increased. However, the routing circuit 120 natively has circuit components for performing the abovementioned verification/check operations. Therefore, the filter 100 of the present invention can provide functions such as IP header verification, MAC/IP address verification, and unicast reverse path forwarding check without increasing the hardware requirements of the access control list circuit 110.

Figure 3:
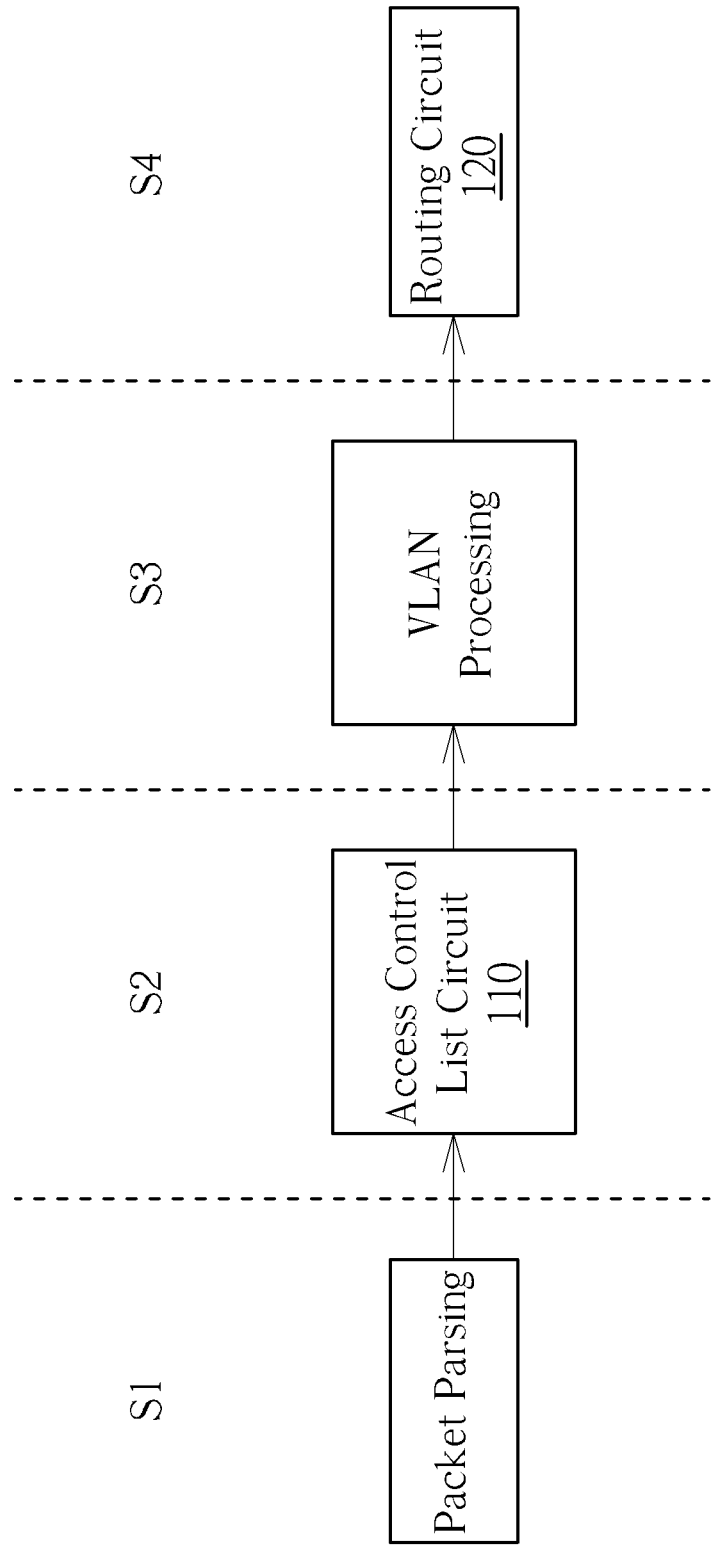
FIG. 3 is a diagram illustrating hardware stages of a network switch according to one embodiment of the present invention.

In the present invention, hardware of the access control list circuit 110 and the routing circuit 120 must be implemented in different hardware stages of the network switch 10, so as to ensure that cooperative operations of the access control list circuit 110 and the routing circuit 120 can completely implement the filter 100. If the access control list circuit 110 and the routing circuit 120 are implemented in a same hardware stage, hardware resource conflicts may occur. Please refer to a diagram illustrating hardware stages in FIG. 3. As illustrated, the network switch 10 of the present invention can arrange processing circuits regarding packet parsing in a first hardware stage S1, arrange the access control list circuit 110 in a second hardware stage S2, arrange processing circuits regarding VLAN in a third hardware stage S3, and arrange the routing circuit 120 in a fourth hardware stage S4. Please note that the above descriptions are only for illustrative purposes. According to various embodiments of the present invention, the number of hardware stages in the network switch 10 may be more or less, and circuit components in the network switch 10 can be configured differently from the embodiment shown in the figure.

Figure 4:
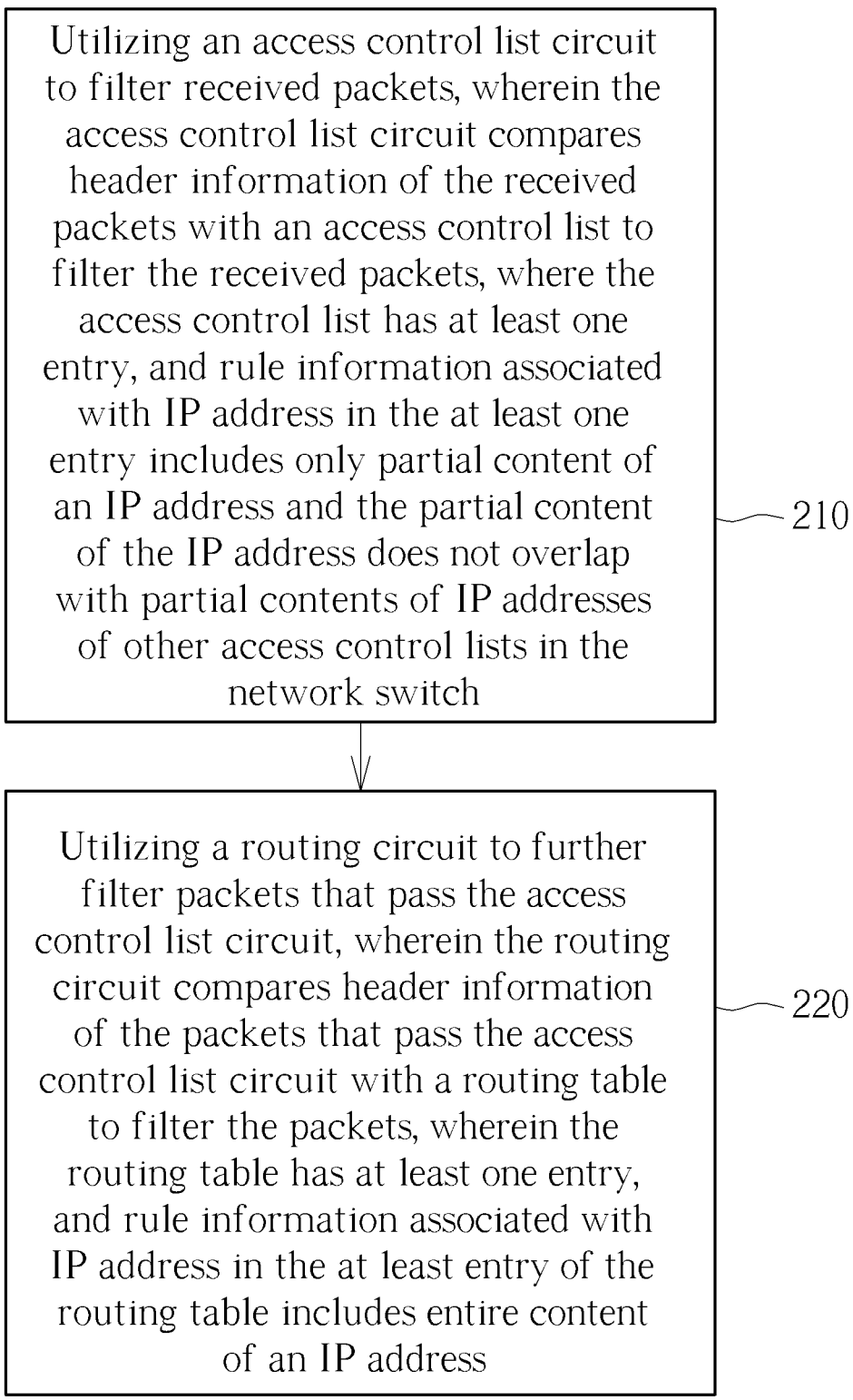
FIG. 4 is a flowchart of a filter according to one embodiment of the present invention.

FIG. 4 shows a simplified flow chart of the method for implementing packet filtering based on cooperative operations of the access control list circuit 110 and the routing circuit 120 in the above-mentioned embodiment. The flow includes the following steps:

Step 210: utilizing an access control list circuit to filter received packets, wherein the access control list circuit compares header information of the received packets with an access control list to filter the received packets, where the access control list has at least one entry, and rule information associated with IP address in the at least one entry includes only partial content of an IP address and the partial content of the IP address does not overlap with partial contents of IP addresses of other access control lists in the network switch; and Step 220: utilizing a routing circuit to further filter packets that pass the access control list circuit, wherein the routing circuit compares header information of the packets that pass the access control list circuit with a routing table to filter the packets, wherein the routing table has at least one entry, and rule information associated with IP address in the at least entry of the routing table includes entire content of an IP address.

As principles and operation details of the above steps have been clearly explained in the previous embodiments, further descriptions are omitted here. It should be noted that in various embodiments of the present invention, it is available to add extra steps based on known techniques in the field, thereby to improve an overall effects of the present invention.

In summary, the present invention expands functions and configurability of the filter without increasing the hardware requirements of the access control list circuit, and makes firewall, blacklisting, whitelisting functions of the network switch more powerful. As packet filtering of the present invention is partially implemented by a routing circuit in the network switch, this allows validation/check operations, such as, IP header verification, MAC/IP address checksum, and unicast reverse path forwarding check, to be performing during packet filtering. Such validation/check cannot be achieved by only using the access control list circuit for packet filtering in the conventional art. Therefore, the present invention significantly improves security protection of the network switch.

Embodiments of the present invention can be implemented using hardware, software, firmware, and/or combinations thereof. Through an appropriate instruction execution system, embodiments of the present invention can be implemented using software or firmware stored in a memory. In terms of hardware, embodiments of the present invention can be implemented using any of the following technologies or a combination thereof: a separate logic having a logic gate capable of performing a logic function according to a data signal, and an application specific integrated circuit (ASIC), a programmable gate array (PGA), or a field programmable gate array (FPGA) having suitable combinational logics.

Flowcharts and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for packet filtering in a network switch, comprising:

utilizing an access control list circuit to filter received packets, wherein the access control list circuit compares header information of the received packets with an access control list to filter the received packets, where the access control list has at least one entry, and rule information associated with IP address in the at least one entry includes only partial content of an IP address and the partial content of the IP address does not overlap with partial contents of IP addresses of other access control lists in the network switch; and utilizing a routing circuit to further filter packets that pass the access control list circuit, wherein the routing circuit compares header information of the packets that pass the access control list circuit with a routing table to filter the packets, wherein the routing table has at least one entry, and rule information associated with IP address in the at least entry of the routing table includes entire content of an IP address.

2. The method of claim 1, wherein the access control list circuit and the routing circuit are respectively arranged in different hardware stages of the network switch.

3. The method of claim 1, wherein rule information in entries of the access control list further includes at least one of following packet features: a portion of a source IP address, a portion of a destination IP address, a source port number, a destination port number, a media access control address, an Ethernet type and a virtual local access network (VLAN) ID.

4. The method of claim 1, wherein rule information in entries of the routing table further includes at least one of following packet features: an entire source IP address, an entire destination IP address, a source port number and a destination port number.

5. The method of claim 1, wherein the step of utilizing the routing circuit to filter the packets comprises:
when utilizing the routing circuit to perform packet filtering, not utilizing the routing circuit to perform a modification operation on the header information of the packets that pass the access control list circuit, wherein the modification operation includes at least one of source address replacement, VLAN ID replacement and decrementing packet's hop limit.

6. The method of claim 1, wherein the step of utilizing the routing circuit to filter packets comprises:
when utilizing the routing circuit to perform packet filtering, utilizing the routing circuit to perform a verification/check operation on the packets that pass the access control list circuit, where the verification/check operation includes at least one of IP header validation, MAC/IP address checksum and unicast reverse path forwarding check.

7. The method of claim 1, wherein the network switch is a network device that is compliant with IPv6 protocol, and the IP address is in IPv6 format.

8. A filter implemented in a network switch, comprising:
an access control list circuit, arranged to filter received packets, wherein the access control list circuit compares header information of the received packets with an access control list to filter the received packets, where the access control list has at least one entry, and rule information associated with IP address in the at least one entry includes only partial content of an IP address and the partial content of the IP address does not overlap with partial contents of IP addresses of other access control lists in the network switch; and
a routing circuit, arranged to further filter packets that pass the access control list circuit, wherein the routing circuit compares header information of the packets that pass the access control list circuit with a routing table to filter the packets, wherein the routing table has at least one entry, and rule information associated with IP address in the at least entry of the routing table includes entire content of an IP address.

9. The filter of claim 8, wherein the access control list circuit and the routing circuit are respectively arranged in different hardware stages of the network switch.

10. The filter of claim 8, wherein rule information in entries of the access control list further includes at least one of following packet features: a portion of a source IP address, a portion of a destination IP address, a source port number, a destination port number, a media access control address, an Ethernet type and a virtual local access network (VLAN) ID.

11. The filter of claim 8, wherein rule information in entries of the routing table further includes at least one of following packet features: an entire source IP address, an entire destination IP address, a source port number and a destination port number.

12. The filter of claim 8, wherein when the routing circuit performs packet filtering, the routing circuit does not perform a modification operation on the header information of packets that pass the access control list circuit, wherein the modification operation includes at least one of source address replacement, VLAN ID replacement and decrementing packet's hop limit.

13. The filter of claim 8, wherein when the routing circuit performs packet filtering, the routing circuit also performs a verification/check operation on the packets that pass the access control list circuit, where the verification/check operation includes at least one of IP header validation, MAC/IP address checksum and unicast reverse path forwarding check.

14. The filter of claim 8, wherein the network switch is a network device that is compliant with IPv6 protocol, and the IP address is in IPv6 format.

* * * * *